United States Patent [19]

Kotzur

[11] Patent Number: 4,471,964
[45] Date of Patent: Sep. 18, 1984

[54] LIQUID PACKING

[75] Inventor: Joachim Kotzur, Oberhausen, Fed. Rep. of Germany

[73] Assignee: M. A. N. Maschinenfabrik Augsburg-Nürnberg Aktiengesellschaft, Fed. Rep. of Germany

[21] Appl. No.: 523,428

[22] Filed: Aug. 16, 1983

[30] Foreign Application Priority Data

Aug. 21, 1982 [DE] Fed. Rep. of Germany ....... 3231171

[51] Int. Cl.$^3$ ...................... F16V 15/16; F16V 15/28
[52] U.S. Cl. ......................................... 277/3; 277/27; 277/72 R
[58] Field of Search .................... 277/3, 27, 72, 75

[56] References Cited

U.S. PATENT DOCUMENTS 3,360,272 12/1967 Blom et al. ............................ 277/27
3,756,673 9/1973 Strub ..................................... 277/27
3,788,652 1/1974 Hirtz et al. ............................ 277/72
4,365,815 12/1982 Scott ...................................... 277/3
4,395,141 7/1983 Pietsch et al. ......................... 277/3
4,408,765 10/1983 Adelmann ............................. 277/3

Primary Examiner—Robert I. Smith
Attorney, Agent, or Firm—McGlew and Tuttle

[57] ABSTRACT

In a liquid packing, the inlet pressure of the sealing liquid is substantially increased above the gas pressure at the high pressure side, by means of a centrifugal packing which is enclosed at both sides by an annular floating body and provided, at both sides, with flow passages and, radially farther, with annular flanges to obtain a safe seal. Check valves opening at a definite intermediate pressure effect a flow of the sealing liquid through the high pressure-side sealing gap between the shaft packing and the floating body and passages in the floating body, to mix it with the supplied sealing liquid, whereby the friction heat produced in the sealing gap is removed to a large extent.

10 Claims, 4 Drawing Figures

LIQUID PACKING

FIELD AND BACKGROUND OF THE INVENTION

This invention relates in general to shaft packing constructions and in particular to a new and useful liquid packing for sealing the shaft clearance between a low pressure zone and a high pressure zone.

A liquid packing for sealing between high and lower pressure seal zones of a shaft is known through German Pat. No. 21 53 560. In this prior art packing, an annular pumping chamber in which the pressure of the sealing liquid is augmented by a centrifugal force, is provided between the bore for supplying the sealing liquid and the sealing gap at the high-pressure side, and the constant pressure of the supplied sealing liquid is only slightly higher than the pressure in the high-pressure zone. In connection with the chamber provided at the operating end of the sealing gap at the high-pressure side, at any speed, the pumping effects of the pumping chambers at the two sides of the high-pressure sealing gap compensate for each other, so that due to the pumping effect, a liquid pressure substantially exceeding that of the operating gas is maintained in the sealing gap at the high pressure side. With the machine at standstill, the higher pressure prevents the operating medium from penetrating into the packing, and also allows only a small leakage of sealing liquid into the high pressure zone.

What is disadvantageous in this prior art packing is that in the partial sealing gap at the high-pressure side, the sealing liquid is close to stagnant, so that the entire friction heat produced in this partial sealing gap and the adjacent centrifugal packing at the high pressure side must be dissipated indirectly, through the housing parts and the shaft bushing. With high circumferential speeds in the sealing gap, the narrow sealing gaps intended to reduce the leakage at standstill are not sufficient. In addition, during normal operation, the front face at the high pressure side of the double bushing surrounding the rotating impeller is exposed to the higher pressure from the pumping chamber, which produces axial forces acting on the front face of the housing and is disadvantageous with a floating double bushing.

SUMMARY OF THE INVENTION

The invention is direct to a development of the packing permitting to remove a part of the friction heat from the location where it is produced directly, through the sealing liquid, while preserving the advantage of extremely small leakage in the high pressure zone at all speeds as well as at standstill.

Accordingly, it is an object of the invention to provide a liquid packing for sealing the shaft clearance between a low pressure zone and a high pressure zone. In accordance with the invention the packing provides a seal between a housing and a shaft bushing from a high presure space or zone to a lower pressure space or a zone. The housing surrounds the shaft bushing and defines a chamber between the high and low pressure spaces. The construction includes a centrifugal packing disc connected to the shaft and having an axially extending flange at each end and having a flow passage on each end radially inwardly of the flanges. An annular floating body encloses the centrifugal packing disc at both ends and the body is spaced from the housing on its outer radial end to define with the housing a sealing liquid distribution chamber. It is spaced on its inner radial end from the shaft bushing to define with the shaft bushing a partial low pressure sealing gap passage leading to the low pressure space and a partial high pressure sealing gap passage leading from the low pressure passage to the vicinity of the high pressure space and the centrifugal packing disc. The flange body has a radial passage intermediate its length for directing sealing fluid from the chamber to the juncture of the two partial low and high pressure sealing gap passages. The housing has an inlet for sealing fluid which connects into the chamber and in addition to radial passage the floating body has check valve control second passage leading to the space around the flanges.

A development of the invention provides that the flow passages comprise blade rows which rotate with the centrifugal disc. The flow passages or blade rows raise the pressure of the sealing liquid which is supplied through the sealing gap at the high pressure side and returns into the distribution chamber through the passage in the floating body and the check valves which open at a speed necessary for dynamically increasing the pressure. In the distribution chamber, the sealing liquid mixes with that flowing in from the outside. The heat produced in the sealing gap at the high pressure side is thus removed along with the so-called overflow sealing liquid and with the sealing liquid flowing through the partial gap in the low pressure side.

The annular, axially extending flanges of the centrifugal packing screen the inner part, with the circulation flow, from the outer zone of the packing in which, during normal operation, the pressure of the sealing liquid is raised to definitely exceed the inlet pressure of the liquid and the gas pressure at the high pressure side.

The passages in the annular floating body are designed as an axially extending conduit and as a radially extending bore. The outer diameter of the axially extending conduit is about equal to the inner diameter of the annular flanges. This is an additional safety preventing the shaft bushing from being brushed, since upon being heated by the concentrically surrounding parts, the L shaped portion can expand away from the shaft.

The improved cooling achieved by the circulation of the sealing liquid in the floating body makes it possible to make the sealing gap at the high pressure side narrower than at the low pressure side, which with an equal differential pressure between the inlet pressure of the sealing liquid and the gas pressure at the high-pressure side reduces internal leakage particularly at standstill.

To obtain an optimum, i.e., a concentric position of the annular floating body relative to the shaft or shaft bushing, the annular floating body must be adjustable radially, without an interference of axial pressures. This may be obtained, in accordance with another development of the invention, by providing that the annular floating body encloses the rotating centrifugal packing at both sides. The pressure rises produced in the annular floating body by the pumping effect at both sides of the centrifugal packing compensate each other. The pressures exerted on the annular floating body from the outside are compensated for by providing O-rings axially at both sides of the body. Their arrangement depends only on the static pressures of the gas and the sealing liquid.

The sealing liquid is advantageously admitted into the distribution chamber radially outwardly of the floating body and it flows through the radial passage to each of the partial high and low pressure sealing gap passages. In accordance with the setting of a check valve, it also flows through the axially extending passage. In one form of the invention the axially extending passage extends to the exterior of the housing and a sealing liquid is recirculated through a degassing unit and a cooling unit back into the distribution chamber.

Accordingly, it is an object of the invention to provide an improved liquid packing for sealing the shaft clearance between a low pressure zone and a high pressure zone wherein the shaft carries a centrifugal packing disc having axially extending flanges on each of its sides located at a radially spaced outward location from the shaft bushing, and including a floating body enclosing the shaft and having passage means for distributing flow intermediate the floating body along a sealing gap passage in a direction of the high pressure zone and a further sealing gas passage in the direction of the low pressure zone.

A further object of the invention is to provide a liquid packing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
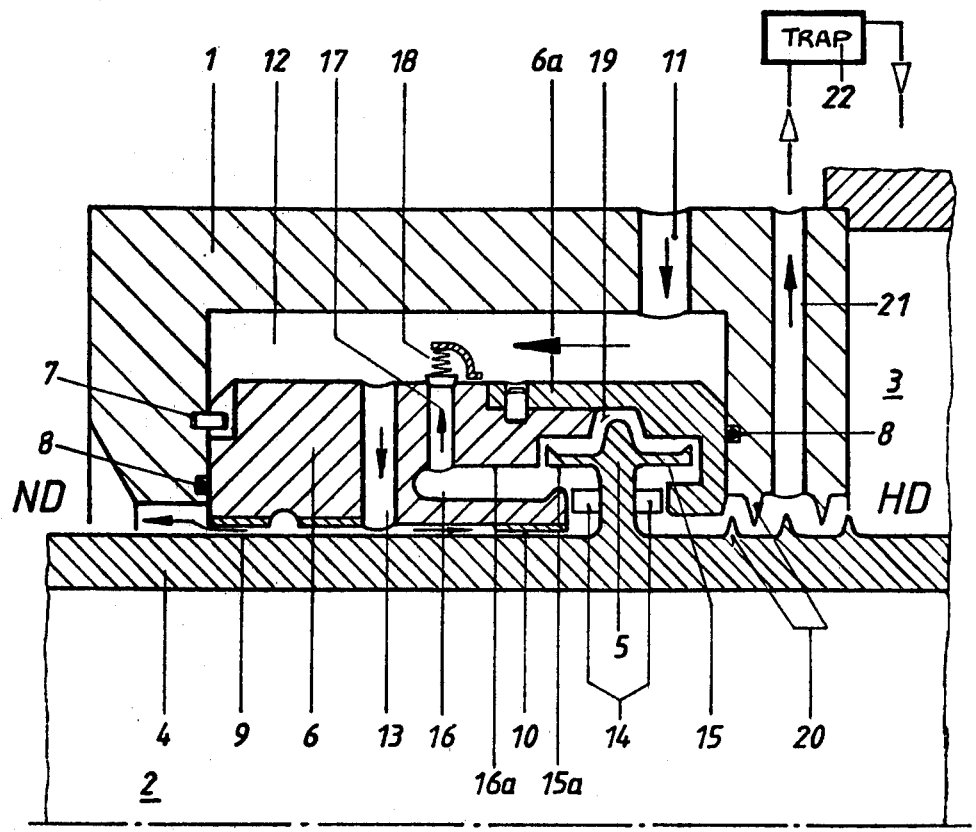
FIG. 1 is a sectional view of a machine having a shaft with a liquid packing.

Referring to the drawings in particular the invention embodied therein, comprises a liquid packing for sealing between the housing and a shaft bushing from a high pressure space to a low pressure space and which comprises a housing portion 1 which surrrounds the bushing 4 of a shaft 2 from a high gas pressure space HD to a lower pressure space ND. The housing surrounds the shaft bushing and defines a chamber 12 for distribution of a sealing liquid between the pressure spaces and radially outwardly of annular floating body having split portions 6 and 6a. The construction includes a centrifugal packing disc 5 connected to the shaft and having an axially extending flange 15 extending outwardly from each end in an axial direction. Disc 5 also has flow passages 14, 14 located radially inwardly of the flanges 15 on each side of the web portion of the packing disc 5. The annular floating body 6, 6a encloses the centrifugal packing disc 5 at both its ends.

The body, 6, 6a is spaced from the housing on its outer radial end to define the distribution chamber 12 which is connected by a passage 11 to a supply of sealing fluid. Sealing fluid flows into the chamber 12 and flows through a radial passage 13 of the floating body 6,6a to the juncture of two partial sealing gap passages one extending toward the high pressure area and one extending toward the low pressure area which are located between the floating body and the shaft bushing 4. The construction includes a check valve 18 which will close the passage 17, the latter comprising a second passage extending from chamber 12 and axially to a space between the packing disc 5 and the floating body 6,6a.

FIG. 1 shows a liquid packing intended to seal the clearance between a machine housing 1 and a shaft 2 passing therethrough, against the penetration of gas under pressure from a space 3. A split annular floating body 6,6a mounted in housing 1 surrounds at both sides a centrifugal packing disc 5. Fixing pins 7 prevent annular floating body 6,6a from being entrained in rotation, but do not obstruct a radial adjustment thereof. O-rings 8 are so arranged that they compensate for the axial forces exerted by the sealing liquid and the gases on the annular floating body. A shaft bushing 4 and annular floating body 6,6a define annular sealing gaps 9 and 10. Housing 1 is provided with a bore 11 for supplying sealing liquid, which opens into a distribution chamber 12. Bores 13 provided in annular floating body 6 lead to the partial sealing gap 9 at the low pressure side, and to the narrower portion sealing gap of chamber 12 at the high pressure side. Centrifugal packing disc 5 is designed at both sides with flow passages 14 and with axially extending annular flanges 15. At the side remote from the high pressure zone of the centrifugal packing disc, a recess passage 16 is provided in annular floating body 6, having an outer diameter 16a, and communicating at its inner end with radial bores 17 which are equipped with check valves 18. The outer diameter portion of centrifugal packing disc 5 revolves within a chamber 19 of the floating body 6. At the high pressure side, housing 1 and shaft bushing 4 are provided with labyrinth ribs 20. Between the labyrinth ribs 20 of housing 1, discharged bores 21 are provided.

Figure 2:
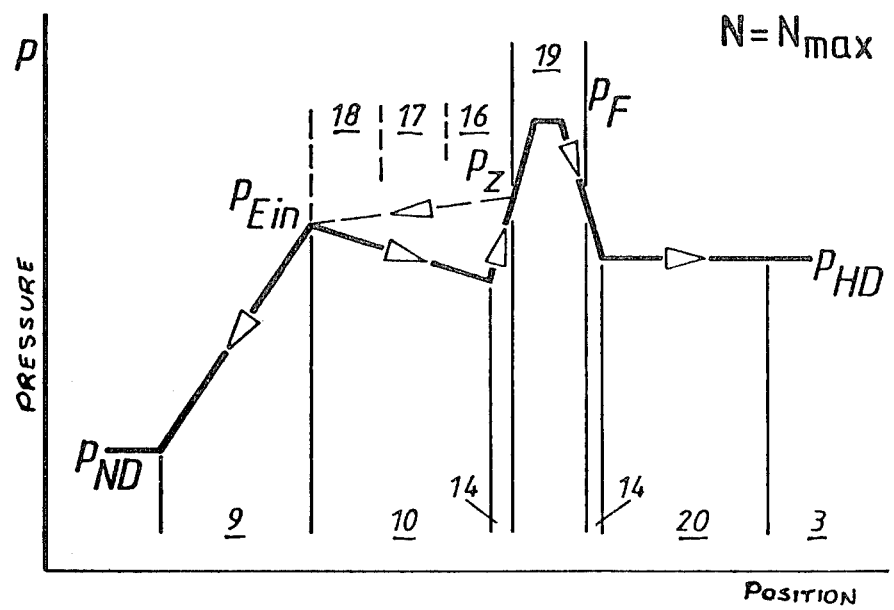
FIG. 2 is a graph showing the pressure distribution at operating speed.
Figure 2A:
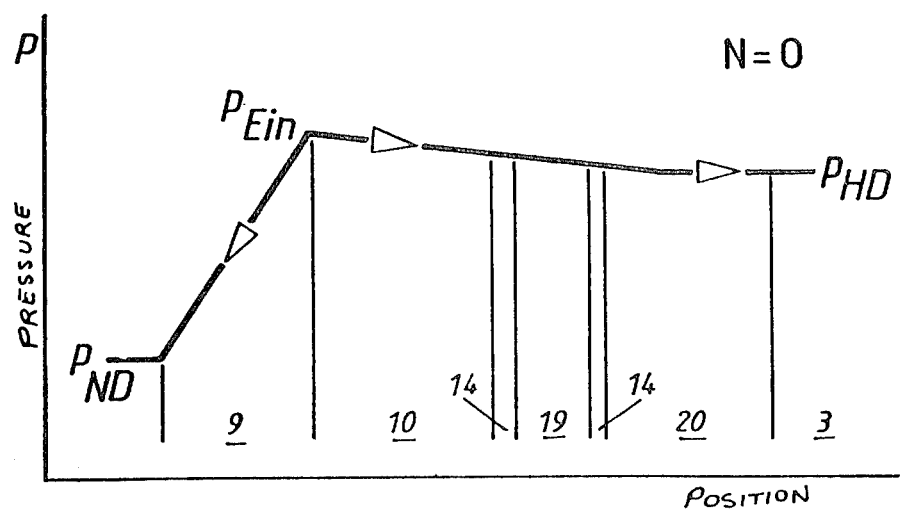
FIG. 2a is a graph showing the pressure distribution at standstill.

The flow variation in the liquid packing will now be explained with reference to FIG. 2. The stream of sealing liquid supplied to housing 1 through bore 11 with a slight excess pressure $P_{EIN}$ over the gas pressure $P_{HD}$ at the high pressure side, and flowing through distribution chamber 12 and bores 13, is then split into two partial streams. One partial stream flows through partial sealing gap 9, is depressurized to a low pressure $P_{ND}$, mostly the atmospheric pressure. The other portion flows through the narrower partial sealing gap 10 to a high pressure side. With an increasing speed of shaft 2, the pressure in centrifugal packing 5 effective at both sides rises to an outer pressure $P_F$ forming a secure barrier against fluctuating gas pressures $P_{HD}$. Upon reaching a set intermediate pressure $P_Z$ which is distinctly above the supply pressure $P_{EIN}$, the two check valves 18 open and sealing liquid is returned through partial sealing gap 10 at the high pressure side, recess 16, and radial bore 17 into the distribution chamber 12 where it is mixed with the freshly supplied sealing liquid. Past both sides of flanges 15, sealing liquid flows into chamber 19, where, at the outer diameter thereof, the highest centrifugal pressure $P_F$ is produced. With a suitable selection of the inlet pressure $P_{EIN}$, the oppositely flowing streams of sealing liquid form in chamber 19 a liquid ring. This liquid ring exerting the outward pressure $P_F$ prevents the operating gas, at a smaller diameter than this outer diameter, from penetrating from the high pressure side into chamber 19, even though circulating sealing liquid is removed at the side remote from the high pressure side of the centrifugal packing disc. At relatively low speeds and at a standstill of the machine (FIG. 2a), check valves 18 are closed and thus prevent the sealing liquid from bypassing from the distribution chamber 12 to the high pressure side. A leak of sealing liquid to the operating gas side is obstructed by labyrinth ribs 20 on housing 1 and shaft bushing 4, yet not quite prevented. The leaking sealing liquid is discharged through bores 21 in housing 1 into a condensor trap 22 and, after stripping the gas, recycled into the sealing liquid circuit.

Figure 3:
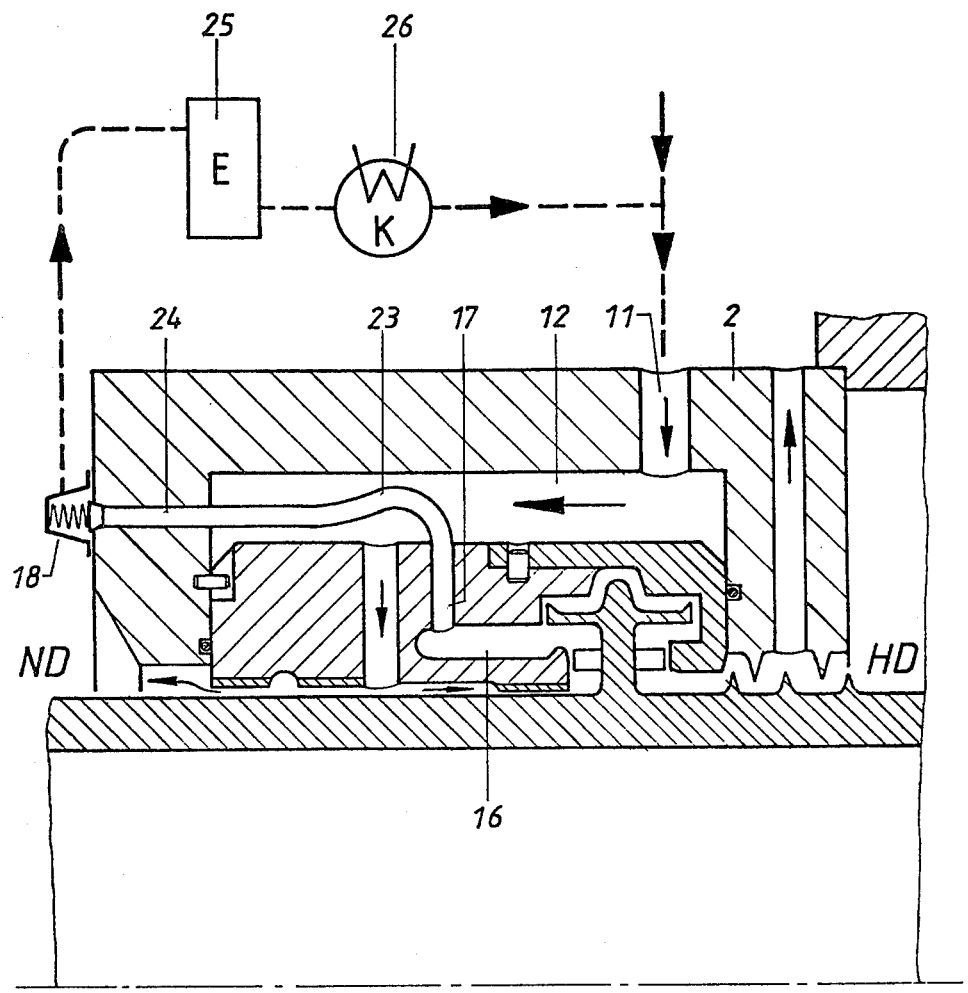
FIG. 3 is a view similar to FIG. 1 showing a liquid packing with a degassifying and a cooling unit in the return line.

In an advantageous embodiment according to FIG. 3, an additional protection against the penetration of operating gas through check valves 18 into distribution chamber 12 may be obtained if the sealing liquid flowing out through bores 17 is not directly introduced into distribution chamber 12, but is directed through elastic lines 23 and bores 24 in housing 1 to the outside where now the check valves 18' are provided, and through a degasification unit 25 and a cooler 26 returned as admixture to the supplied sealing liquid.

While specific embodiments of the invention have been shown and described in detail to illustrate the application of the principles of the invention, it will be understood that the invention may be embodied otherwise without departing from such principles.

What is claimed is:

1. A liquid packing for sealing between a housing and a shaft bushing from a high pressure space to a low pressure space, comprising a housing portion surrounding the shaft bushing defining a chamber between said housing portion and said shaft bushing and extending between the high gas pressure space and the low pressure space, a centrifugal packing disc connected to the shaft and having an axially extending flange at each end and having a flow passage on each end located radially inwardly of said flanges, an annular floating body enclosing said centrifugal packing disc at both ends, said floating body being spaced from said housing at its outer radial end to define with said housing a sealing liquid distribution chamber and being spaced from said shaft bushing at its inner end to define with said shaft bushing a partial pressure sealing gap passage leading to the lower pressure space and also a partial high pressure sealing gap passage leading to the vicinity of said centrifugal packing disc in the high pressure space, said floating body having a first passage extending radially and located intermediate its length for directing sealing fluid from said chamber to the juncture of said partial low pressure and said high pressure sealing gap passages, a sealing fluid inlet connected into said chamber, and a second passage extending from said chamber through the space between said floating body and said sealing disc and to the vicinity of the high gas pressure space, check valve means between said chamber and second passage.

2. A liquid packing according to claim 1, wherein said flow passages comprise blade rows which are totable along with said centrifugal packing disc and which may be adjusted to the flow conditions on the respective sides of said disc.

3. A liquid packing according to claim 1, wherein said annular floating body comprises an axially extending member and wherein said second passage is an outer diameter which is about equal to the inner diameter of said annular flange.

4. A liquid packing according to claim 1, wherein said second passage includes a wall diameter which joins the high pressure side in the form of an L cross section.

5. A liquid packing according to claim 1, wherein said partial high pressure sealing gap passage is of a narrower internal diameter than said low pressure sealing gap passage.

6. A liquid packing according to claim 1, wherein said floating body encloses said rotating centrifugal packing at both of its sides.

7. A liquid packing according to claim 1, wherein said check valve is located exteriorly of said housing and permits outward flow from said second passage and a degassing and a cooling unit connected to said outward flow.

8. A liquid packing according to claim 1, including a labyrinth seal extending between said floating body and the high gas pressure space.

9. A liquid packing according to claim 8, including a passage extending from said labyrinth seal to the exterior of said housing.

10. A liquid packing according to claim 1, wherein said check valve is located within said chamber.

* * * * *